United States Patent Office 3,466,939
Patented Sept. 16, 1969

3,466,939
MECHANICAL COUPLINGS
Sven Almvide, Goteborg, Sweden, assignor to Aktiebolaget Original-Odhner, Goteborg, Sweden, a joint-stock company of Sweden
Filed Dec. 14, 1967, Ser. No. 690,681
Claims priority, application Sweden, Dec. 19, 1966, 17,347/66
Int. Cl. F16h 27/02, 31/00; F16d 11/00
U.S. Cl. 74—142                    9 Claims

ABSTRACT OF THE DISCLOSURE

There is disclosed herein a mechanical coupling of the type used for transmitting the drive from a drive motor to a driven shaft in a calculating or accounting machine.

This disclosure sets forth a mechanism comprising smoothly interengaging, positive coupling means for effecting the engagement and disengagement of a driven shaft upon the actuation of control means, such as operating keys in a keyboard, wherein said coupling means are adapted to cease their operative engagement after one revolution of said driven shaft.

---

The present invention relates to mechanical couplings and has for its particular object the provisions of couplings for power-driven calculating and accounting machines in which a coupling drive member directly or indirectly connected to the drive motor is adapted, upon actuation of the coupling, to be engaged with a driven coupling member provided on an axle of the machine to be driven.

The known couplings of this type suffer from the drawback that their actuation is apt to engender shocks and impacts thereby causing excessive mechanical wear and disturbing noise.

It is an object of the invention, therefore, to provide a coupling in which these deficiencies have been eliminated.

This and other desirable objects are attained by the provision of a coupling in which said first coupling member is shaped at the circumference thereof with a plurality of recesses, corresponding to the number of teeth of said tooth-wheel shaped member, said both members fast with said driving coupling member, pawl means on said driven coupling member to hold said coupling members in any of a number of predetermined relative angular positions by engagement with said tooth-wheel shaped member, a coupling arm pivotally mounted on said driven coupling member and shaped with a hook-like projection, the said hook-like projection located directly opposite one of said recesses in any of said predetermined angular positions, and control means to establish, upon actuation, a position drive connection between said coupling members by making said hook-like projection engage the said directly opposed recess.

Figure 1:
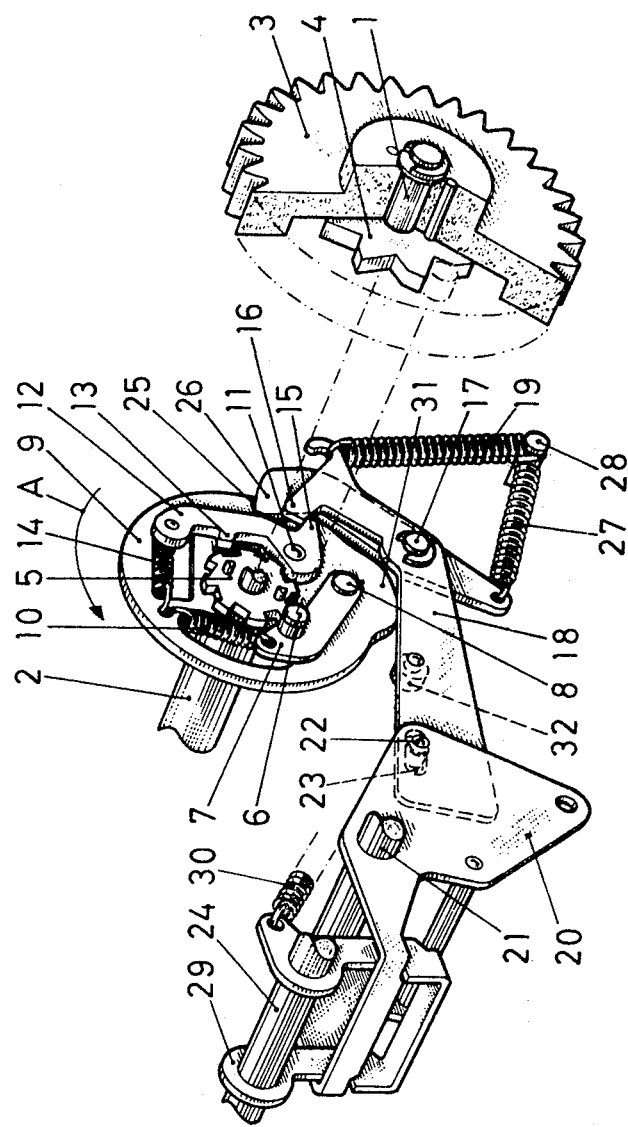
Figure 2:
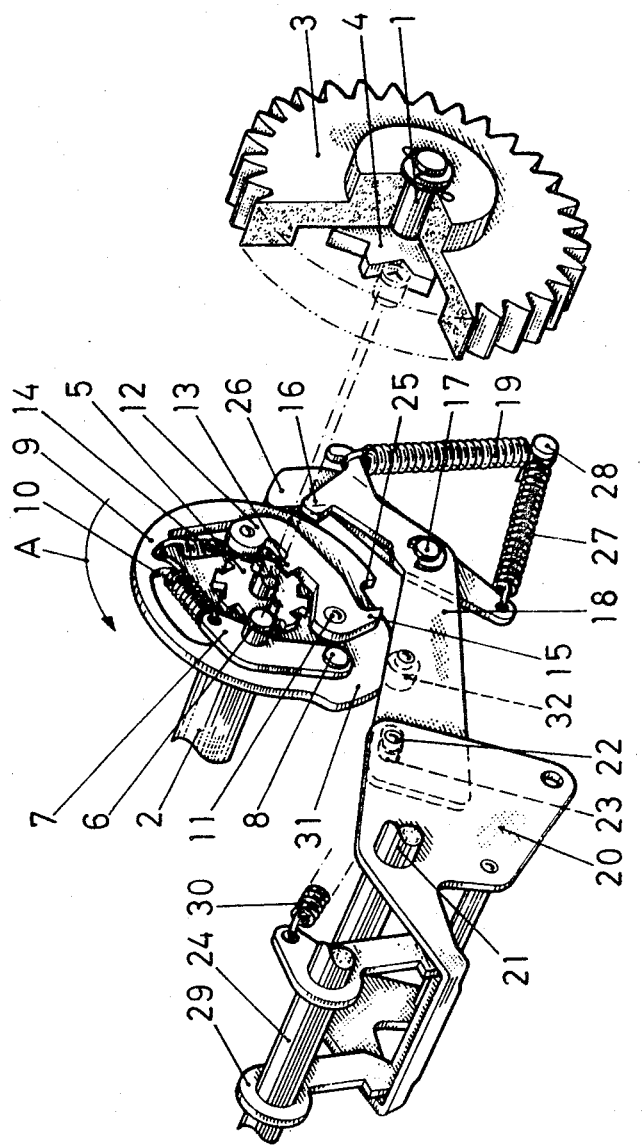
Figure 3:
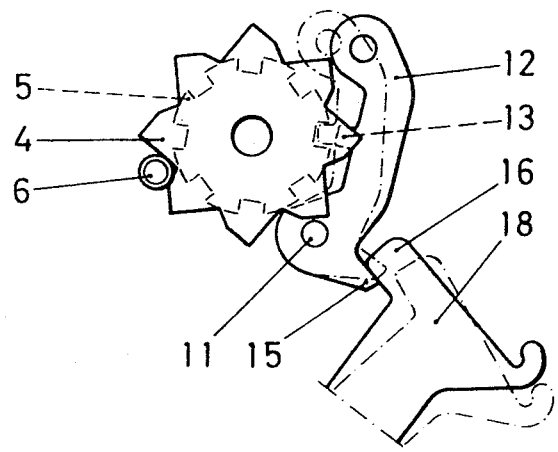

A preferred embodiment of the invention will be described hereinafter with reference to the annexed drawings in which FIGS. 1 and 2 are exploded perspective views of a coupling in two different positions of operation. FIG. 3 is a cross-section view of the coupling with portions removed or broken away.

As can be seen from the drawings the coupling is mounted on an axle 1, 2 having two different diameters. On the smaller diameter 1 a gear 3 is mounted freely rotatable, whereas the thicker axle portion 2 is journalled in the frame (not illustrated) of a calculating or accounting machine which can be of a kind well-known in itself. The gear 3 will receive drive from a drive motor (not illustrated), and at its flank facing left in the drawings a substantially star-shaped wheel 4 provided with eight teeth is rigidly secured. Outside this star wheel 4 a coupling wheel 5, likewise provided with eight teeth and intermediate recesses or notches, is rigidly mounted.

The star wheel 4 cooperates with a roller 6 journalled for rotation on a pin projecting laterally from a pawl member 7. This pawl member 7 is supported at one end on a pivot 8, extending axially from a disc-shaped coupling member 9 rigidly mounted on the driven shaft 1, 2. The coupling member 9 also affords a fixing point for a spring 10 urging pawl member 7 into engaging its roller 6 with star wheel 4. At the disc-shaped coupling member 9 further a coupling arm 12 is mounted on an axially extending pivot 11, said coupling arm being shaped with a projection 13 extending essentially radially to the axle portion 2. The projection 13 at coupling arm 12 is destined for engagement with coupling wheel 5 mounted at the gear 3, the required swing motion of the coupling arm 12 being imparted thereto by a spring 14 attached by its rear end portion to the coupling member 9. Elongated apertures have been formed in coupling member 9 for accommodating the springs 10 and 14.

The coupling arm 12 is further shaped with a second projection 15 extending approximatively radially to the pivot 11. In the operation position illustrated in FIG. 1 this projection 15 engages a hook-shaped projection 16 at a latch lever 18 mounted on a pivot 17. The latch lever 18 is subjected to the action of a tension spring 19 urging the lever to swing clockwise to disengage the hook-shaped projection 16 from the projection 15 at the coupling arm 12. The latch lever 18 is retained releasably in the engaged position illustrated in FIG. 1 by an operation bail member 20 mounted on a pivot axle 21 supported by the machine frame (not illustrated). One shank portion of the bail member 20 is provided with a pin member 22 engaging a slot 23 in the latch lever 18. The latter can be maintained thereby in the position illustrated in FIG. 1 wherein the hook-shaped projection 16 is held in engagement with the projection 15 as coupling arm 12 against the bias of spring 19.

In its inactive position shown in FIG. 1, latch lever 18 maintains coupling arm 12 such that spring 14 is in tension, thereby preventing movement of coupling member 9 in the counter-clockwise direction designated by arrow A. To prevent such clockwise rotation of the coupling member 9 the latter is shaped with a recess in its rim portion, one shoulder portion 25 of which provides an abutment (best seen in FIG. 2) for a return catch lever 26 mounted on the pivot 17 and held in engagement position by a tension spring 27, the opposite end of which is attached to a pin 28 fast in the machine frame (not illustrated). The pin 28 affords an anchor for the tension spring 19 connected to latch lever 18, as well. By the influence of the return catch lever 26, abutment 25, spring 14, coupling arm 12, projection 15 and hook-shaped portion 16 at the latch lever 18, the coupling member 9 and thus also the coupling arm 12 with its hook-shaped projection 13 is maintained in a predetermined angular position in which the hook-shaped projection 13, as best seen in FIG. 3, lies directly opposite a corresponding recess in the coupling wheel 5, the latter held by virtue of the star wheel 4, roller 6, arm 7 and the tension spring 10 acting on the latter in a corresponding predetermined angular position.

The operation bail member 20 is formed with a middle portion extending axially between its both shank portions, said middle portion being engaged by two shoulders provided at a hook-up bail 29 pivotally supported by an axle 24 and urged by a spring 30 towards its position of engagement. The opposite end of spring 30 is secured to any suitable stationary part of the machine structure (not illustrated). If the hook-up bail 29 is swung against spring force to the position illustrated in FIG. 2 by being actuated from the non-illustrated keyboard of the machine, the middle portion of operation bail member 20 will become disengaged from the shoulders of hook-up bail 29. The operation bail 20 thereby, through the influence of the spring 19 and by virtue of the pin-and-slot connection 22, 23 will be swung together with the latch lever 18 to the position illustrated in FIG 2. On this swing motion of latch lever 18 its hook-shaped portion 16 will be moved out of engagement with the projection 15 of the coupling arm 12 as illustrated with dash and dot lines in FIG. 3. Concurrently therewith, the coupling arm 12 is swung by its spring 14 into its position illustrated with dash and dot lines in FIG. 3. In that position the hook-shaped projection 13 has been moved into engagement with a corresponding one of the recesses in the coupling wheel 5. When immediately after this engagement the drive motor is started up (by non-illustrated means) and drive is imparted to gear 3 the disc-shaped coupling member 9 will be carried along through the engagement between coupling wheel 5 and the projection 13 at coupling arm 12, and consequently also the axle 1, 2 non-torsionally connected to the coupling member will take part in this motion. On the rotation of the coupling member 9 the return catch lever 26 will automatically become disengaged from the abutment 25, the lever 26 being maintained during a full revolution in contact with the outer rim of coupling member 9. After a complete revolution the lever 26 moves afresh into the recess in the coupling member for engagement with the abutment 25.

During a major part of the revolution the latch lever 18 takes up the retracted position illustrated by dash and dot lines in FIG. 3. In order to break the drive engagement the latch lever 18 must be restored to the position illustrated by continuous lines in FIGS. 1 and 3 before the revolution is completed, in order to make the hook-shaped portion 16 of latch lever 18 intercept the projection 15 at coupling arm 12. During the remainder of the revolution the coupling arm 12 is swung against the action of spring 14 so as to disengage the hook-shaped projection 13 from the coupling wheel 5. This counter-clockwise return of latch lever 18 is effected by the action of the coupling member 9 shaped along part of its circumference as a cam curve 31. As seen from FIG. 2 this cam curve 31 will engage towards the end of the revolution of coupling member 9 a roller 32 rotatably mounted at the latch lever 18. During the passage of the cam curve 31 the latch lever 18 is swung counterclockwise, the operation bail 20 being by virtue of the pin- and slot-connection 22, 23 swung clockwise, and its middle portion will slide along the spring-biassed hook-up bail 29. The middle portion of the operation bail 20 will resume upon completion of its clockwise return swing motion the position illustrated in FIG. 1 in which said middle portion engages the shoulders of the hook-up bail 29. On continued rotation of coupling member 9 thus the projection 15 of the coupling arm 12 will be caught by the hook-shaped portion 16 at latch lever 18 in a manner described above, whereby upon complete disengagement of the hook-shaped projection 13 of the coupling arm 12 from the coupling wheel 5 the return catch lever 26 will click into the recess of the coupling member 9 providing the abutment 25.

As will have been understood from the foregoing description the improved coupling will effectively eliminate all impacts and shocks on starting the machine cycle, as the coupling elements become automatically engaged with each other without free play of any importance so that the axle 1, 2 and the gear 3 will be firmly and positively connected when the drive motor is started up and drive shall be transmitted. The invention is not restricted to the embodiment described and illustrated in the drawings, but can be varied as to its details within the scope of the inventive idea.

What I claim is:

1. Mechanical coupling apparatus, comprising a first coupling member, a second coupling member responsively cooperative with said first coupling member, a third coupling member supported by said first coupling member and being formed with a plurality of recesses, a coupling arm pivotally supported by said second coupling member and formed with a projection adapted to matingly engage one of said recesses, a wheel member secured to said first coupling member and formed with a number of circumferentially spaced teeth corresponding to the number of said recesses, and pawl means supported by said second coupling member in engagement with said teeth for holding said first coupling member and said wheel member in one of a plurality of predetermined relative annular positions, said positions including said projection being disposed opposite one of said recesses.

2. Mechanical coupling apparatus according to claim 1, further comprising control means for causing movement of said coupling arm to effect engagement between said projection and said circumferentially recessed member, thereby effecting a positive drive between said first and second coupling members.

3. Mechanical coupling apparatus according to claim 2, wherein said coupling arm is spring-biased toward its position of engagement and is formed with a second projection extending substantially radially with respect to said second coupling member.

4. Mechanical coupling apparatus according to claim 3, further comprising a latch lever which includes abutment means for holding the second projection of said coupling arm in an inactive position.

5. Mechanical coupling apparatus according to claim 4, wherein upon predetermined movement of said latch lever, said coupling arm is free to move into a drive engagement position.

6. Mechanical coupling apparatus according to claim 5, wherein the said second coupling member is formed with a shoulder portion at its circumference, said coupling apparatus further comprising a spring-biased catch member adapted to engage said shoulder portion to hold said second coupling member in an angular position in which said coupling arm is held out of said drive engagement position.

7. Mechanical coupling apparatus according to claim 6, further comprising spring means for urging said latch lever away from said coupling arm.

8. Mechanical coupling apparatus according to claim 7, wherein said second coupling member includes cam means for moving said latch lever to an initial position after movement of said coupling arm into said drive engagement position.

9. Mechanical coupling apparatus according to claim 8, further comprising means for moving said coupling arm away from its position of engagement during a revolution of said second coupling member.

References Cited

UNITED STATES PATENTS

| 1,919,651 | 7/1933 | Helsel | 192—28 |
| 1,987,742 | 1/1935 | Lawrence | 192—28 |

FOREIGN PATENTS

| 129,435 | 12/1960 | U.S.S.R. | |

FRED C. MATTERN, Jr., Primary Examiner
W. S. RATLIFF, Jr., Assistant Examiner

U.S. Cl. X.R.
192—28